UNITED STATES PATENT OFFICE.

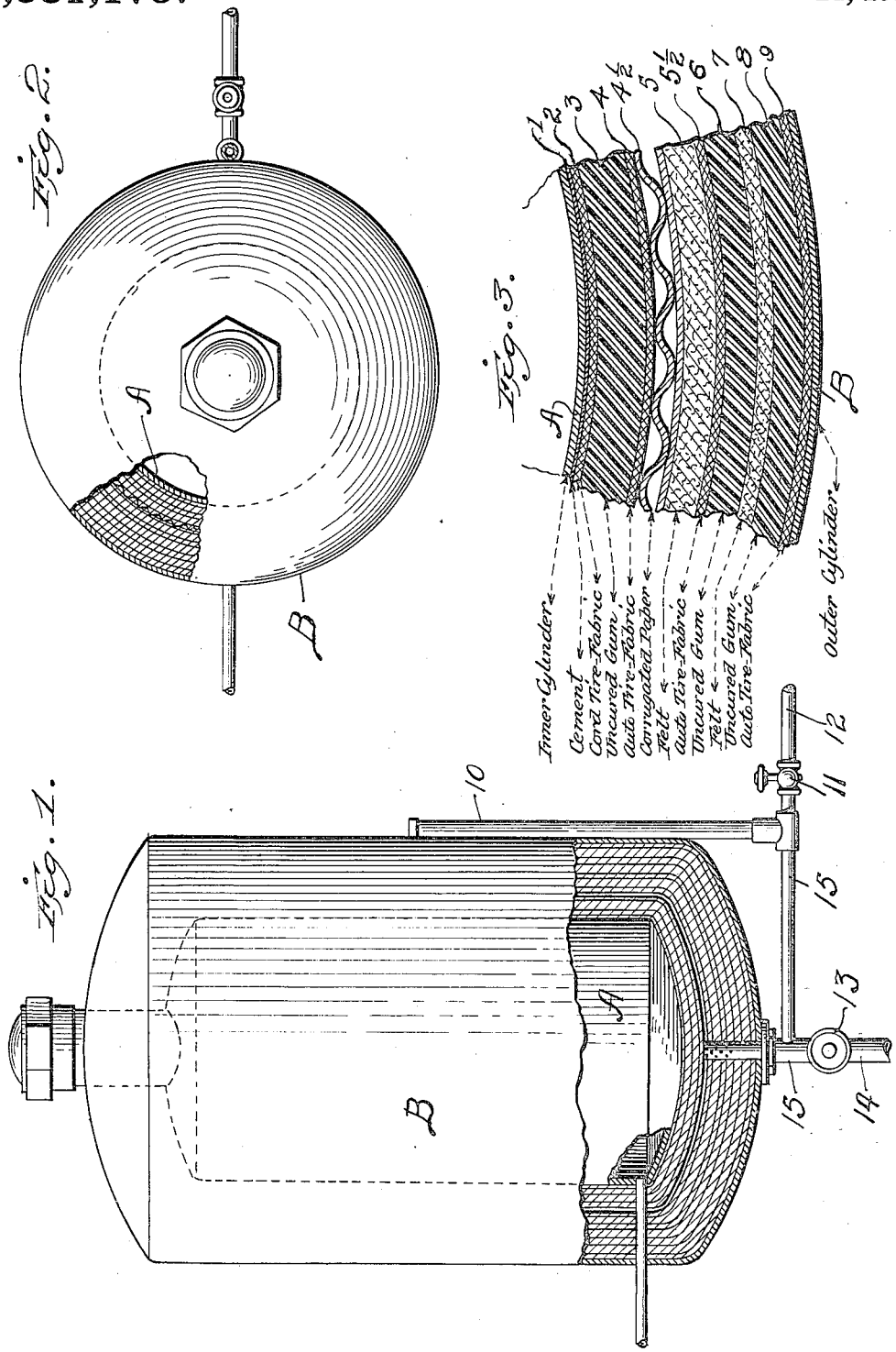

HERMAN C. ERICSSON, OF THE UNITED STATES ARMY.

ANTIEXPLOSIVE AND NON-INFLAMMABLE GASOLENE-TANK.

1,381,175. Specification of Letters Patent. Patented June 14, 1921.

Application filed February 14, 1919. Serial No. 277,119.

*To all whom it may concern:*

Be it known that I, HERMAN C. ERICSSON, a citizen of the United States of America, and an officer in the Army of said country, have invented certain new and useful Improvements in Antiexplosive and Non-Inflammable Gasolene-Tanks, of which the following is a full and clear specification.

This invention has special reference to gasolene tanks for aeroplanes, and its general object is to prevent destruction of the plane by explosion or flame through puncture of the tank in aerial combat.

In the drawings—

Figure 1 is a vertical section partly in side elevation of a tank constructed in accordance with my invention;

Fig. 2 is a plan view thereof partly in horizontal section;

Fig. 3 is an enlarged horizontal section through a portion of the composite wall of the tank.

Referring to the drawings, the inner tank A is desirably composed of rolled steel or copper 22-gage, preferably copper, with oval side, top and bottom. The principle of oval design is to strengthen the tank, minimize the danger of springing a leak at edges upon concussion of bullet, and also that the compound packing, hereinafter described, may be drawn taut. This tank may be built to conform to any make of machine, only requiring oval sides, end and bottom, as stated. The use of rolled steel or copper when punctured prevents tearing or cracking, leaving only a small hole.

The compound packing is placed on said inner tank A in layers as follows: A thin layer 1 of adhesive cement is first supplied to the tank; the object of this is to hold the next layer, of cord fabric, 2, taut, this cord fabric layer being designed to strengthen the tank and give a face for the next layer 3 of uncured rubber, *i. e.*, pneumatic tire-tread gum, which when punctured will reduce, if not stop, the flow of gasolene. 4 is a layer of auto tire fabric which keeps the rubber 3 firm and prevents tearing of a large hole on opposite sides of the tank. The next layer 4½ is of corrugated paper with the corrugations running vertically to form a multiplicity of small vertical channels which will serve to carry leakage down to the bottom of the tank, this corrugated paper extending entirely over the bottom so as to form radial drain channels which all lead to the inlet end of a gage pipe 15 extending up through the outer tank B and through the layers intermediate the bottom wall of this outer tank and the corrugated-paper layer.

The next layer 5 is ¼-inch felt; the object of this is to wipe off residue and phosphorus from incendiary bullets and assist in absorbing what gasolene might leak past the drainage channels. The next layer 5½ is auto tire fabric, which serves to reinforce and hold the felt and to prevent leakage gasolene from affecting the next outer layer 6 of tire-tread gum, which latter layer will reduce or close the bullet-hole and prevent further leakage. The next layer 7 is ⅛-inch felt, which will cushion the bullet and wipe off phosphorus from incendiary bullets, this felt being non-inflammable. To hold the felt firm and to still further reduce, if not close, the puncture, I add another layer 8 of uncured pneumatic tire-tread gum; and to support this gum layer, I make another layer 9 of auto tire fabric.

The aforesaid outer tank B is of the same material and shape as the inner tank and is sufficiently larger than said inner tank to leave a space of say 1¾ inches between the inner and outer tanks for packing. All leakage from punctures will, as stated, be carried down to the drain or gage pipe 15, and thus be registered on upright gage-pipe 10 connected to said pipe 15, thus enabling the pilot to determine the seriousness of the leak. A pipe 14 is connected to the drainage-pipe 15 and provided with a valve 13; and pipe 15 is provided with an extension 12 which is provided with a valve 11; by these valves and pipes, leakage may be disposed of in any desirable manner, either by being piped and pumped back into the tank or by being led away and discharged at a point away from the plane.

It will be observed that each layer and each material I use in my compound packing has its own individual function and that combined these layers extinguish the blaze on a tracer bullet for the reason that the hole closes behind the bullet, thereby shutting out air and rendering the bullet harmless except for the puncture it produces. Thus an incendiary bullet is rendered harmless except for puncture, in that the phosphorous is wiped from the bullet when the same passes through the various layers of non-inflammable material, and an explosive bullet is rendered absolutely harmless, as explosion will occur on contact with the outer tank and cannot disrupt the packing sufficiently to injure the inner tank.

I claim:

1. An expansible elastic packing tightly confined between two rigid metallic shells consisting of layers of puncture-closing rubber and bullet-wiping fibrous material, for the purpose set forth.

2. An elastic packing interposed between two metallic shell containers and consisting of an elastic mass having a vertical drainage chamber formed therein, a bottom drainage tube being provided for said drainage-chamber.

3. In an aeroplane fuel container, two metallic tanks one inclosed within the other, an elastic puncture-closing bullet-wiping packing between the two tanks, said packing extending over the bottom of the tank, a draining chamber in the packing extending entirely around the tank and the bottom thereof, a drainage tube extending out from said drainage chamber, and piping connected to said drainage tube and having a leakage-gage connected to said piping.

4. A fuel container for airships comprised of an inner tank and an outer tank, an intermediate puncture-closing packing having a drainage chamber formed of a multiplicity of vertical channels in communication with a multiplicity of radial channels at the bottom of the tank, and a common drainage tube for these channels.

5. The combination with a metallic-container, of a puncture-closing elastic mass covering the same and having formed within it a vertical drainage-chamber for draining leakage toward the bottom of the container, and a drainage-pipe connected to said drainage-chamber for carrying away the drainage.

6. The combination with a metallic fuel-container, of a packing inclosing the same, said packing being tightly affixed to the exterior of the container and having provided within it a drainage-chamber extending entirely around the container, and a drainage-tube extending out from said drainage-chamber and having a leakage-gage connected to it.

7. The combination with a metallic liquid-fuel container, of an elastic covering extending entirely around the same and tightly fitted to the container, said covering embodying a layer of elastic expansible material adapted to automatically close punctures, and a tire-tape covering tightly binding the said elastic layer to the container wall.

8. The combination with a metallic liquid-fuel container, of a packing surrounding the same and embodying a layer of elastic puncture-closing material and means for binding it tightly to the container, a drainage-chamber surrounding said layer, an outer layer of elastic puncture-closing packing surrounding said drainage-chamber and means for tightly binding said outer layer in place, and a bottom drainage-tube connected to said drainage-chamber for draining away leakage.

9. In combination with a liquid-fuel container, an elastic layer tightly bound around said container, a drainage-chamber formed around said layer, a layer of felt arranged outside of the drainage-chamber, another layer of elastic puncture-closing material tightly bound on the exterior of the felt layer, means for tightly binding this last elastic layer in place, and a bottom drainage-tube connected to said drainage-chamber.

10. In a fuel container of the class set forth, a vessel for containing fuel, an outer vessel spaced away therefrom and having a drainage-chamber entirely surrounding the inner vessel, a bottom drainage-chamber communicating with the aforesaid chamber, and a drainage-tube connected to said bottom chamber.

11. A tank for combustible or other liquids wherein the walls are composed of an inner metal lining, an outer metal lining, a plurality of layers of rubber between the linings, and inner and outer fabric layers intimately contacting with the outer surface of the rubber layers and contacted by the metal linings.

In testimony whereof I hereunto affix my signature.

HERMAN C. ERICSSON.